US012590895B2

(12) United States Patent
Hollerman et al.

(10) Patent No.: US 12,590,895 B2
(45) Date of Patent: Mar. 31, 2026

(54) METHOD FOR MEASURING FLUORESCENT DECAY IN PHOSPHORS

(71) Applicant: UNIVERSITY OF LOUISIANA LAFAYETTE, Lafayette, LA (US)

(72) Inventors: William A. Hollerman, Lafayette, LA (US); John Miller, Lafayette, LA (US); Tolga Karsili, Lafayette, LA (US); Stephen W. Allison, Lafayette, LA (US)

( * ) Notice: Subject to any disclaimer, the term of this patent is extended or adjusted under 35 U.S.C. 154(b) by 103 days.

(21) Appl. No.: 18/196,684

(22) Filed: May 12, 2023

(65) Prior Publication Data

US 2023/0366817 A1 Nov. 16, 2023

Related U.S. Application Data

(60) Provisional application No. 63/341,155, filed on May 12, 2022.

(51) Int. Cl.
*G01K 11/00* (2006.01)
*G01N 21/64* (2006.01)

(52) U.S. Cl.
CPC ................................. *G01N 21/6408* (2013.01)

(58) Field of Classification Search
None
See application file for complete search history.

(56) References Cited

U.S. PATENT DOCUMENTS

| | | | | |
|---|---|---|---|---|
| 5,949,539 | A | * | 9/1999 | Britton, Jr. ............. G01K 11/20 |
| | | | | 374/E11.024 |
| 6,123,455 | A | * | 9/2000 | Beshears ................ G01K 11/20 |
| | | | | 374/161 |
| 8,011,827 | B1 | * | 9/2011 | Djeu ........................ G01K 7/42 |
| | | | | 374/161 |

* cited by examiner

*Primary Examiner* — Marcus H Taningco
(74) *Attorney, Agent, or Firm* — Ted M. Anthony; Sarah B. Dupont

(57) ABSTRACT

Disclosed herein is a methodology which quickly provides for the analysis of multiple luminescence decays from individual phosphor samples. The disclosed method utilizes a Trust-Region method to provide non-physical solutions when the fitting application was not provided with bounds for the respective intensities and decay times. Results from Double Decay were found to be statistically similar to data analyzed in methodologies known in the art.

11 Claims, 12 Drawing Sheets

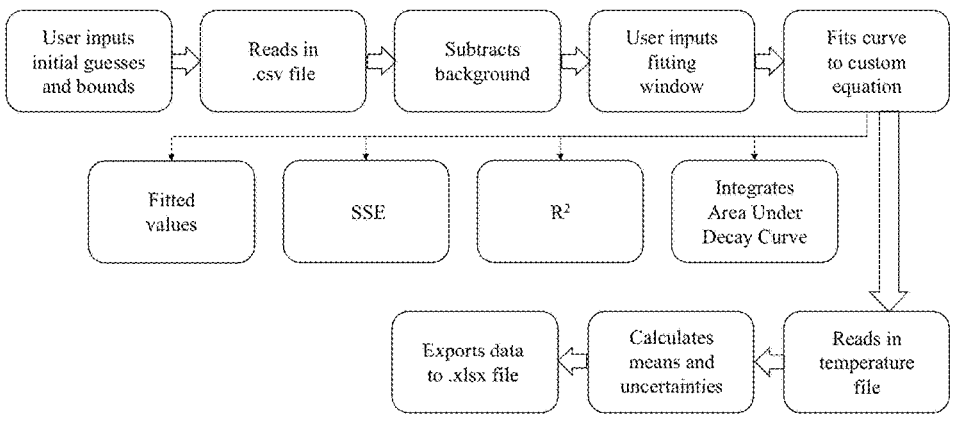
FIGURE 3
Single Exponential Fit                                    Double Exponential Fit
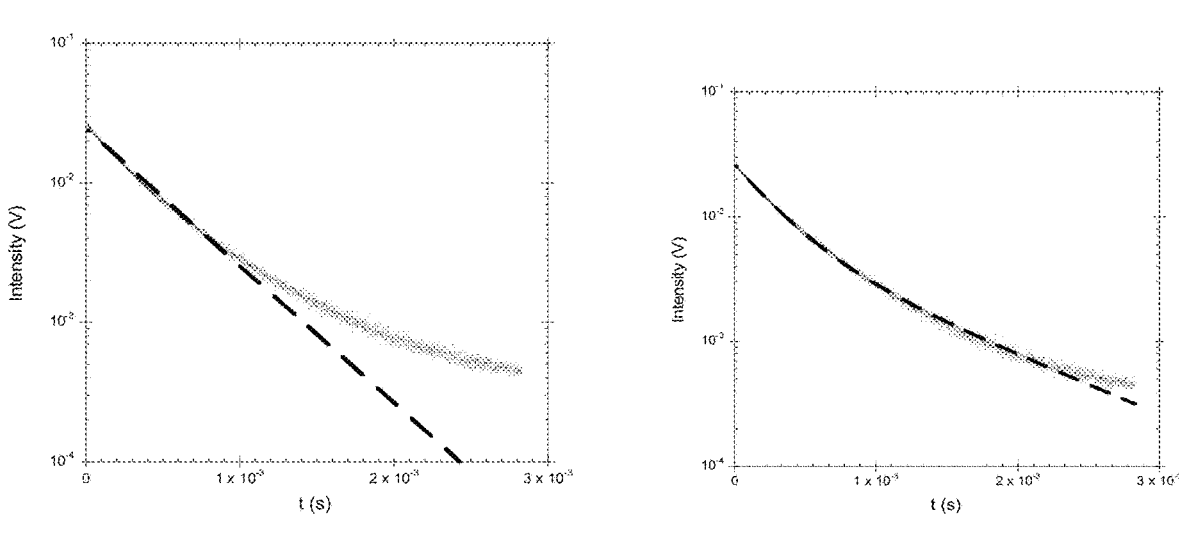
FIGURE 4A                                              FIGURE 4B

TABLE II. THE BOUNDS AND INITIAL GUESSES USED IN *DOUBLE DECAY* TO FIT THE SAMPLES OF INTEREST.

| Important Parameter | Lower Bound | Upper Bound | Initial Guess/Setting |
|---|---|---|---|
| $I_1$ | 0 V | Max V | 0.5 (Max V) |
| $I_2$ | 0 V | Max V | 0.5 (Max V) |
| $\tau_1$ | 0.001 µs | 10,000 µs | 200 µs |
| $\tau_2$ | 0.001 µs | 10,000 µs | 800 µs |
| Function Tolerance | N/A | N/A | $1.0 \times 10^{-9}$ V |
| Variable Tolerance | N/A | N/A | $1.0 \times 10^{-9}$ s |

FIGURE 7

```
function [fitresult, gof] = createFit1(T1,Y1,Beta,Tau,I1,I2)
%CREATEFIT1(T1,Y1)
%  Create a fit.
%
%  Data for 'Decay' fit:
%      X Input : T1
%      Y Output: Y1
%  Output:
%      fitresult : a fit object representing the fit.
%      gof : structure with goodness-of fit info.
%
%  See also FIT, CFIT, SFIT.

%  Auto-generated by MATLAB on 07-Jun-2018 16:02:05

%%% Fit: 'Decay'.
[xData, yData] = prepareCurveData( T1, Y1);

% Set up fittype and options. The current equation is setup to fit the decay times in
microseconds, but can be changed. Users should change it to meet the needs of the decay curves
being fit.

ft = fittype( 'a*exp(-1000000*x/(b*d))+c*exp(-1000000*x/d)', 'independent', 'x', 'dependent', 'y'
);

%  The fitting method used is a Non-linear Least Squares method.

opts = fitoptions( 'Method', 'NonlinearLeastSquares' );
opts.Display = 'Off';

% The lower bounds allow for either decay intensity to be 0, meaning a single decay is present.
Additionally, the long decay time, tau, is allowed to be as short as 1/1000th of the time scale
chosen. Any smaller than this, the time scale should be changed in the fit equation. The ratio is
also allowed to be 1/1000th of the long decay time. Any ratio smaller than this is probably going
to be indistinguishable from a single decay time.

opts.Lower = [0 0.001 0 .001];

% The upper bounds are passed into the function. This provides better continuity from one data
point to the next.

opts.StartPoint = [I1 Beta I2 Tau];
```

FIGURE 8

% The upper limits allow for either decay to contribute the entirety of the decay, yielding the single decay case. Similarly, the ratio can be 1, yielding the same result. If the decay time is longer than 10,000, then the user should change the time scale in the fit equation.

opts.Upper = [max(Y1) 1 max(Y1) 10000];

% The tolerance in both the x and y of the fit are set to 1 in 1,000,000,000 for my peace of mind.

opts.TolFun = 1e-09;
opts.TolX = 1e-09;

% Fit model to data.
[fitresult, gof] = fit( xData, yData, ft, opts );

% Create a figure for the plots.
figure( 'Name', 'Decay' );

% Plot fit with data and 95 percent confidence intervals.
subplot( 2, 1, 1 );
h = plot( fitresult, xData, yData, 'predobs' );
legend( h, 'Y1 vs. T1', 'Decay', 'Lower bounds (Decay)', 'Upper bounds (Decay)', 'Location', 'NorthEast' );
% Label axes
xlabel Time
ylabel Intensity
grid on % Plot residuals, the difference between the fit and the data.

subplot( 2, 1, 2 );
h = plot( fitresult, xData, yData, 'residuals' );
legend( h, 'Decay - residuals', 'Zero Line', 'Location', 'NorthEast' );
% Label axes
xlabel Time
ylabel ResidualIntensity
grid on

FIGURE 8 cont'd

```
clear all

Temp=xlsread('Lot125ReduxTemp.xlsx');

Intervals=xlsread('Lot125ReduxTimeIntervals.xlsx','A2:B111');

Tstart=Intervals(:,1)';
Tend=Intervals(:,2)';

nfile=input('How many files are you processing?    ')

loops=floor(nfile/100);

first=input('What is the first file to process?    ')

primer=ceil(first/100);

if mod(nfile,100)==0
    excess=0;
else
    excess=nfile-100*loops;
end filetype=['.csv'];

Beta=0.5;
Tau=1000;
    for v=primer:loops+1
        if v<loops+1
            last=v*100;
        else
            last=loops*100+excess;
        end
        for iv=first:last
            if iv<nfile+1
                if iv<11
                    tek=['tek000'];
                elseif iv>10 & iv<101
                    tek=['tek00'];
                elseif iv>100 & iv<1001
                    tek=['tek0'];
                else
                    tek=['tek'];
                end
```

g=[num2str(iv-1)];

filename=cat(2,tek,g,filetype);

M=csvread(filename,21,0);

T=M(:,1)';
Y=M(:,2)';

Ymin=min(Y);

if Ymin<0
    for xx=1:length(Y)
        Y(1,xx)=Y(1,xx)-Ymin;
    end
end i=1;
b=0;
while T(1,i)<0
    b=b+Y(1,i);
    i=i+1;
end
i=i-1;
background=b/i;

for ii=1:length(T)
    Y(1,ii)=Y(1,ii)-background;
end ii=1;
for i=1:length(Y)
    if Y(1,i)>0
        Y2(1,ii)=Y(1,i);
        T2(1,ii)=T(1,i);
        ii=ii+1;
    end
end

%     For initial fitting of a new material, the start and end
times for the fitting window will need to be determined visually
by the user. The method provided plots the data, allowing the
user to visually inspect the data and choose the bounds for the
fitting window.

```
                    figure(999)
                    plot(T,Y)
                    datacursormode on
                    Tstart(1,iv)=input('What is the start time?
')
                    Tstart(1,iv)=3.52e-05;
                    for i=1:length(T)
                        if T(1,i)==Tstart(1,iv)
                            Tstart(1,iv)=i;
                        end
                    end
                    figure(1000)
                    plot(T,Y)
                    datacursormode on
                    Tend(1,iv)=input('What is the end time?   ')
                    for gg=1:length(T)
                        if Tend(1,iv)==T(1,gg)
                            Tend(1,iv)=gg;
                            iv
                        end
                    end Ymax=0;
                shift=-Tstart(1,iv)+1;
                for iii=Tstart(1,iv):length(T)
                    if Y(1,iii)>Ymax
                        Ymax=Y(1,iii);
                    end
                end
```

%  In the event the user has determined the minimum percent
signal that should be included in the fitting window, this
section allows the user to hard code the range that the end of
the fitting window should inhabit.

for iii=Tstart(1,iv):length(T)-251
    check=100*mean(Y(1,iii:iii+251))/Ymax;
    if check<1.26 & check>1.22
        checkpass(1,gg)=iii+125;
        gg=gg+1;
    end
end
Tend(1,iv)=checkpass(1,1);
iv for iii=Tstart(1,iv):Tend(1,iv)
    T1(1,iii+shift)=T(1,iii)-T(1,Tstart(1,iv));
    Y1(1,iii+shift)=Y(1,iii);
end Y1=smooth(Y1)';
iv I1=max(Y1)*0.5;
I2=I1;

[DecayFit, gof]=RatioFit(T1,Y1,Beta,Tau,I1,I2);

a=DecayFit.a;
b=DecayFit.b;
c=DecayFit.c;
d=DecayFit.d;

Values(iv,1)=a;
Values(iv,2)=b;
Values(iv,3)=c;
Values(iv,4)=d;
Values(iv,5)=gof.sse;
Values(iv,6)=gof.rsquare;
Values(iv,7)=trapz(T1,Y1);
Values(iv,8)=Tstart(1,iv);
Values(iv,9)=Tend(1,iv);

if mod(iv,5)==0
 Beta=mean(Values(iv-4:iv,2));
 Tau=mean(Values(iv-4:iv,4));
end
else
```

FIGURE 9 cont'd

```
        review=input('Speak friend and enter.')

%  Closes the 100+ plots open to free up memory.

close all

%  Sets the new lower limit for the inner for loop.

first=100*v+1;
    end i=1;
    ii=1;
    while i<nfile+1
            Valuesbar(ii,1)=mean(Temp(i:i+4,1));
            Valuesbar(ii,2)=std(Temp(i:i+4,1));
            Valuesbar(ii,3)=mean(Values(i:i+4,1));
            Valuesbar(ii,4)=std(Values(i:i+4,1));
            Valuesbar(ii,5)=mean(Values(i:i+4,2));
            Valuesbar(ii,6)=std(Values(i:i+4,2));
            Valuesbar(ii,7)=mean(Values(i:i+4,3));
            Valuesbar(ii,8)=std(Values(i:i+4,3));
            Valuesbar(ii,9)=mean(Values(i:i+4,4));
            Valuesbar(ii,10)=std(Values(i:i+4,4));
            Valuesbar(ii,11)=mean(Values(i:i+4,7));
            Valuesbar(ii,12)=std(Values(i:i+4,7));
            Valuesbar(ii,13)=mean(Values(i:i+4,5));
            Valuesbar(ii,14)=std(Values(i:i+4,5));
            Valuesbar(ii,15)=mean(Values(i:i+4,6));
            Valuesbar(ii,16)=std(Values(i:i+4,6));
            i=i+5;
            ii=ii+1;
    end IntensityShort=figure(6);
errorbar(Valuesbar(:,1),Valuesbar(:,3),Valuesbar(:,4));
set(IntensityShort,'name','Short Intensity vs
Temperature','numbertitle','off');
IntensityLong=figure(9)
errorbar(Valuesbar(:,1),Valuesbar(:,7),Valuesbar(:,8));
set(IntensityLong,'name','Long Intensity vs
Temperature','numbertitle','off');
Intensities=figure(5);
plot(Valuesbar(:,1),Valuesbar(:,3),Valuesbar(:,1),Valuesbar(:,7)
);
legend('Short Intensity','Long Intensity');
```

FIGURE 9 cont'd

```
set(Intensities,'name','Intensities vs
Temperature','numbertitle','off');
TauRatio=figure(3);
errorbar(Valuesbar(:,1),Valuesbar(:,5),Valuesbar(:,6));
set(TauRatio,'name','Tau Ratio vs
Temperature','numbertitle','off');
TauLong=figure(4);
errorbar(Valuesbar(:,1),Valuesbar(:,9),Valuesbar(:,10));
set(TauLong,'name','Long Decay vs
Temperature','numbertitle','off');
DecayTimes=figure(8)
plot(Valuesbar(:,1),Valuesbar(:,5).*Valuesbar(:,9),Valuesbar(:,1
),Valuesbar(:,9));
legend('Short Decay','Long Decay');
set(DecayTimes,'name','Decay Times vs
Temperature','numbertitle','off');
Area=figure(7);
errorbar(Valuesbar(:,1),Valuesbar(:,11),Valuesbar(:,12));
set(Area,'name','Area Under the Curve vs
Temperature','numbertitle','off');

U=array2table(Valuesbar,'VariableNames',{'Temperature','StdDevTe
mp','Intensity1','StdDevI1','TauRatio','StdDevTauRatio','Intensi
ty2','StdDevI2','DecayTime2','StdDevTau2','Area','StdDevArea','S
SE','StdDevSSE','R2','StdDevR2'});
writetable(U,'Lot125ReduxRatioAnalysis.xlsx')

V=array2table(Values(:,8:9),'VariableNames',{'Tstart','Tend'});
writetable(V,'Lot125ReduxTimeIntervals.xlsx')
```

FIGURE 9 cont'd

METHOD FOR MEASURING FLUORESCENT DECAY IN PHOSPHORS

CROSS REFERENCE TO RELATED APPLICATIONS

This application claims priority to U.S. Provisional Application No. 63/341,155, titled "RATIO TEMPERATURE SENSING METHOD", filed on May 12, 2022.

STATEMENT REGARDING FEDERALLY SPONSORED RESEARCH OR DEVELOPMENT

None.

REFERENCE TO A "SEQUENCE LISTING," A TABLE, OR A COMPUTER PROGRAM

Not Applicable.

DESCRIPTION OF THE DRAWINGS

The drawings constitute a part of this specification and include exemplary embodiments of the Ratio Temperature Sensing Method, which may be embodied in various forms. It is to be understood that in some instances, various aspects of the invention may be shown exaggerated or enlarged to facilitate an understanding of the invention. Therefore, the drawings may not be to scale.

FIG. 3 depicts a logic workflow chart for the Double Decay fitting program.

FIG. 4A depicts the plot of photoluminescent intensity versus time for the $EuD_4TEA$ sample collected at room temperature with appropriate curve fits for single exponential decay.

FIG. 4B depicts the plot of photoluminescent intensity versus time for the europium tetrakis (dibenzoylmethide) triethylammonium ($EuD_4TEA$) sample collected at room temperature with appropriate curve fits for double exponential decay.

FIG. 7 provides a table of the bounds and initial guesses used in applicants' experimentation of the Double Decay method to fit the selected samples of interest.

FIG. 8 provides example computer code written in MAT-LAB® for the process of fitting recorded data using the disclosed Double Decay method.

FIG. 9 provides example computer code written in MAT-LAB® for the measuring of the decay using the disclosed Double Decay method.

BACKGROUND OF THE INVENTION

Figure 1:
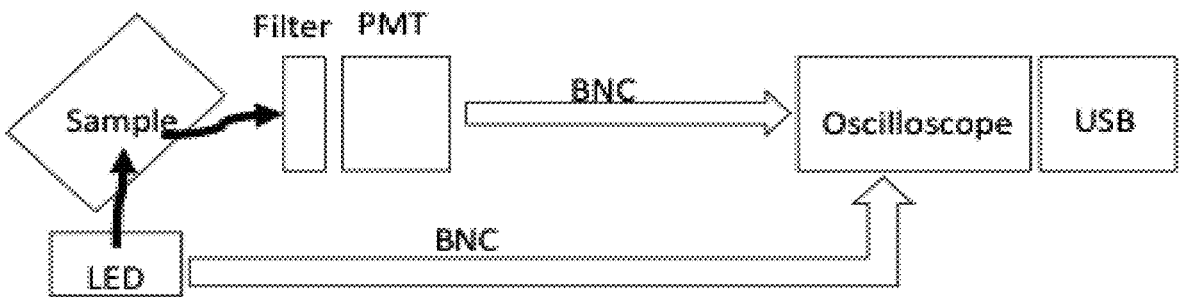
FIG. 1 depicts a thermographic phosphor measuring device for standard decay time measurements showing the phosphor sample holder 3 with the Peltier cooler 8 and a thermocouple.

A phosphor is a solid material that emits luminescence not caused by incandescence. Phosphors in the ground state are able to absorb energy from an external source such as another electron, photon, or electric field. When this happens, they are reconfigured to an excited state electronic configuration. The change back to the ground state emits light. Materials that are photoluminescent are also known as PL materials.

The basic physics of phosphors is well understood, and researchers have demonstrated their utility in a wide variety of applications. Phosphors provide most of the illumination produced by fluorescent lamps and are also used to improve the quality of light produced by metal halide lamps. Various neon signs use phosphors to produce different colors of light. Electroluminescent displays in aircraft use phosphors to produce glare-free illumination as digital and graphic display devices. White LED lamps consist of a blue or ultraviolet emitter with a phosphor coating that emits at longer wavelengths such as red, thereby providing a more complete spectrum of visible light. When electronically excited, phosphors emit cold light. Adding metallic dopants or rare earth impurities to a host crystal can create luminescent centers that change the overall emission characteristics or intensity.

The phosphor thermometry method relies on measuring the rate of decay of the fluorescence yield as a function of temperature. Having calibrated the phosphor over the desired temperature range, a small surface deposit is excited with a pulsed light source. The resulting fluorescent decay time (typically less than 1 ms) is measured to calculate the temperature of the substrate. In many instances, (e.g., in a continuous steel galvanneal process) a simple puff of powder onto the surface provides an adequate fluorescent signal.

Often temperature measurements are made using thermocouples or optical pyrometry. However, in situations where rapid motion or reciprocating equipment is present at high temperatures, it is best to use other techniques. The most common temperature-dependent properties that are usually measured for a given phosphor are the: (1) fluorescence decay time, (2) the ratio of different bands of the emission spectrum, (3) fluorescence rise time, (4) total emission yield, (5) emission spectrum, and (6) absorption spectrum. Modern light detectors/arrays and fiber optic spectrometers allow researchers to easily measure the total emission yield as well as the emission spectra for most phosphors. However, it is more difficult and time consuming to complete these measurements as a function of temperature. A temperature control system for the sample is required to complete these measurements.

Some materials are photoluminescent, that is, they emit cold light when excited by a light source. For example, many people are familiar with the glow in the dark stars that are commonly stuck to the ceiling of kids' rooms. The light emission of PL materials is sensitive to several factors. The temperature of the material, the wavelength of the excitation source, the pulse duration of the excitation source, the frequency of the excitation, the filter used to observe the material, and the radiation dose the material has received all affect the emission. This means that a PL material can be used to measure one of these factors providing the others are known.

As temperature is one of the fundamental observable quantities, and many things have an operating temperature range, thermometry is a good use of PL materials. In fact, the temperature of a jet engine in operation has been measured to the nearest 0.1° C. using PL materials. This field of measurement is called phosphor thermometry. The basic idea is to find a property of the material that changes linearly and monotonically over some temperature range, measure it over that range to provide a calibration curve, and then measure it in situ to infer the temperature. Monotonic functions either never increase or never decrease.

PL light emission can be described using a couple of properties. The spectrum of the light emitted tells how much light is emitted in the different parts of the spectrum, visible, ultraviolet (UV), and infrared (IR). If the PL material is excited temporarily, the light emission following the end excitation will decay exponentially. This light emission curve can be characterized by the time it takes for the emission intensity to reach a factor of $e^{-1}$ of its original intensity, called the decay time ($\tau$). The light yield is the amount of light emitted by the PL material. These three properties of the emission—the spectrum, the decay time, and the light yield—are all characteristic of the material.

The characteristic shape of a PL material's emission spectrum has a couple of features that can be used to measure the temperature. The emission is generally in the shape of one or more peaks or hills. One feature that is temperature sensitive is the wavelength of the maximum of a peak or hill. The maximum can shift from longer to shorter wavelengths or vice versa. Another feature is the width of the peak or hill. Some materials' spectra broaden or narrow with temperature.

The light yield is a property that can be seen in both the spectrum and the light decay curve. The total light yield is the sum of all the light emitted after an excitation. As a function of temperature, it generally decreases. Another way to view light yield comes from the spectrum. It is known to those skilled in the art that a spectrum can have multiple peaks or hills. The light yield of each peak or hill can be found simply by summing the values for the intensities. Sometimes the ratio of the light yields for two peaks changes linearly and monotonically with temperature.

The fluorescence decay and rise times can be difficult to measure. Those skilled in the art have measured fluorescent decay and rise times down to the nanosecond timescale. Conceptually, these measurements are not difficult but in practice, they can be time consuming. The classical method involved using high energy pulsed lasers to excite the material, and ovens to heat it. The lasers required stricter safety regulations, and the ovens mean only 1-2 data points could be taken per day, meaning a full temperature range could take up to two weeks. This system did significantly reduce the amount of time needed to collect and analyze data. However, this system was designed to collect data when the samples were at room temperature. A better system is needed to obtain the calibration curves more quickly.

Fitting these PL materials' emission curves has been difficult for those skilled in the art. The general solution has been to algorithmically find a fitting window—a section of the emission—that can be fit to equation 1. Recently a fitting routine capable of fitting emission decay curves that fit equation 2 has been used by those skilled in the art. Unfortunately, the decay times of the PL material fitted by this routine did not decay monotonically. The fractional emissions were basically constant over the temperature range.

Obtaining a calibration curve for these properties as a function of temperature also presents problems. It is important to eliminate light from sources that are not the PL material in question. Additionally, achieving thermal stability at higher temperatures can be challenging, causing a single data run to take two weeks.

Thermographic phosphor measuring devices known in the art were designed to measure the temperature-dependent fluorescence rise and decay times as well as the total light yield for almost any selected phosphor. Such apparatus can provide for prompt measurement of fluorescent decay and rise times over a temperature range of −10 to 80° C. The availability of these devices allows students to quickly determine the fluorescent decay and rise times for most phosphors, thus improving their ability to analyze materials. Yet, such devices known in the art are not designed to take spectral measurements.

Those skilled in the art have used other programs to analyze single decays. Some software provides the user with crosshairs to pinpoint the bounds of the fitting window. Also, the curve is presented in semi-logarithmic form, so that linear regions can be easily identified and fitted. An unfortunate drawback of using such programs is that it is very time consuming to analyze a large number of files.

SUMMARY OF THE INVENTION

Here disclosed is a method for measuring fluorescent decay in phosphors through a thermographic phosphor measuring device and applicable programs. The inventors herein have disclosed a new application called Double Decay which will quickly provide for the analysis of multiple decays from individual phosphors. Results from Double Decay were found to be statistically similar to data analyzed in earlier publications. The photoluminescent decay times measured with the TPM Device were shown to compare favorably with previously reported results. The disclosed method identifies temperature-dependent emission lifetimes using trajectory surface hopping. Trajectories may be initiated on the excited state at a given temperature. The trajectories may further be propagated in time by determining the nuclear coordinates and numerically evaluating the time-dependent Schrodinger equation for the electronic coordinates. In the preferred embodiment, the nuclear coordinates may be developed using Newton equations. At each time step, the excitation energies may be automatically obtained on-the-fly and thus may be used in to construct a temperature dependent emission spectrum as a function of time. This technique allows quick characterization of phosphors without the need for excessive and lengthy experimentation.

DETAILED DESCRIPTION OF THE INVENTION

Figure 2:
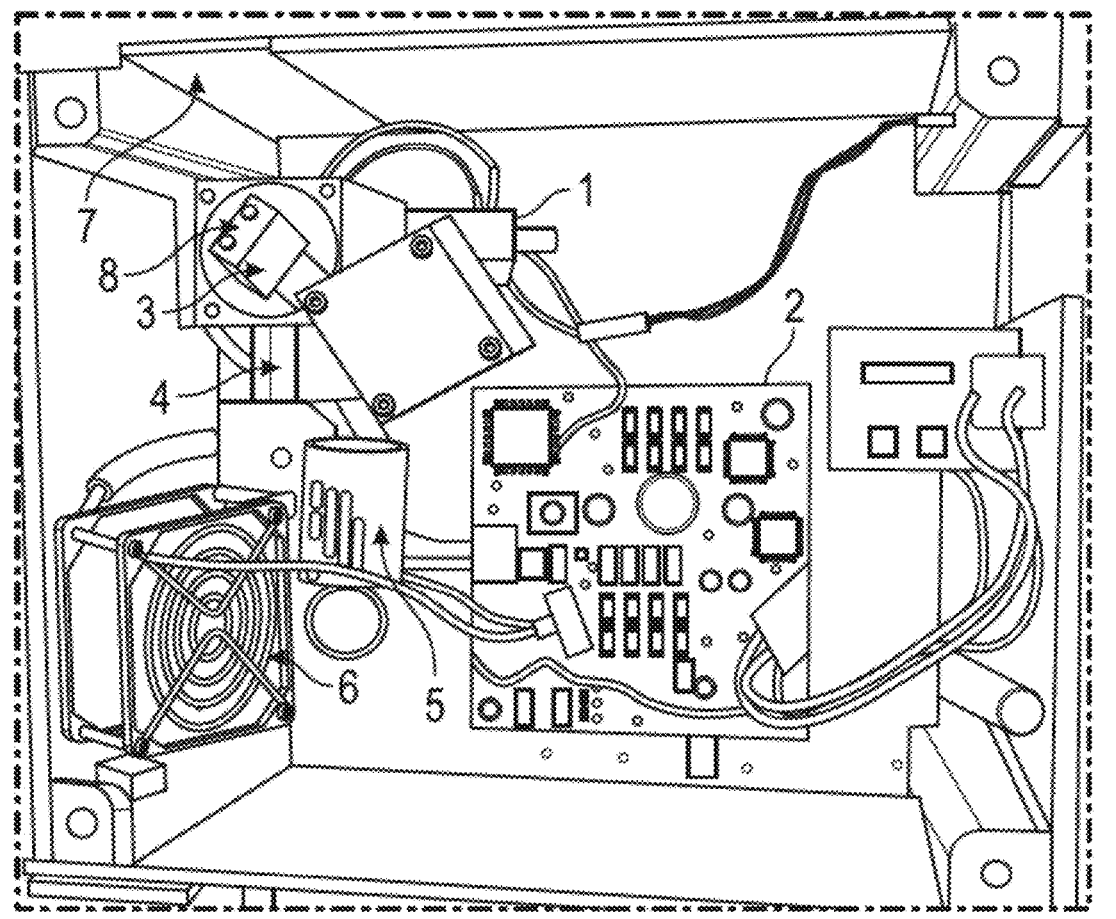
FIG. 2 depicts a drawing of the interior of the TPM Device apparatus comprising a light source 1, control circuit board 2, phosphor sample holder 3 clamped to a Peltier cooler 8, narrow band filter and holder 4, photomultiplier tube 5, cooling fan 6, and removable panels 7 to allow external access.

Description of the Basic Thermographic Phosphor Measuring Device. This method utilizes a thermographic phosphor measuring device. With reference to FIG. 2, the thermographic phosphor measuring device ("TPM Device") comprises a display, preferably located on an exterior panels 7 as shown in FIG. 2, for digital readouts (located at the bottom left in FIG. 2) for the current through the Peltier cooler 8 heating and cooling of the phosphor sample (preferably to the nearest milliampere) and the temperature measured by the thermocouple (preferably to the nearest 0.1° C.). The exterior panel 7 of an embodiment of the TPM Device may further comprises toggle switches to turn the photomultiplier tube 5 (PMT) On/Off and to switch the Peltier cooler 8 to Heat/Off/Cool. In an embodiment, the exterior panel further 7 comprises mechanisms to adjust current flowing through the Peltier cooler 8, the PMT 5 gain, and the excitation pulse width and repetition rate. The adjustment mechanism can be through any variable adjustment method including but not limited to analog knobs, button controls, or other mechanisms known in the art. The TPM Device further comprises a circuit board 2 and associated circuitry that provides power and control functionality to the TPM Device.

The preferred embodiment of the TPM Device allows a user to vary several settings. Settings that can be varied include the LED pulse width (ρs), LED pulse repetition rate, Peltier cooler current, and the PMT gain. In an embodiment, the LED pulse width may be set in a range of 0.8-74.0 ρs. In an embodiment, the LED pulse repetition rate may be set in a range of 12.6-2,300 Hz. In an embodiment, the Peltier cooler current may be set in a range of 0.047-0.950 A. In an embodiment, the Peltier cooler in the TPM Device is used at a temperature between −10 and 80.0° C. In another embodiment, the Peltier cooler in the TPM Device is used at a temperature below 100° C.

A block diagram of the data collection system for the TPM Device is shown in FIG. 1. In the TPM Device, the testing sample is exposed to light via a light source 1 (which may include an LED or another lighting mechanism). In an embodiment, the light source 1 comprises a 373 nm LZ1-00UV00 light source diode; however, those having skill in the art will recognize that LEDs of other wavelengths may also be used. The phosphor sample is held by a sample holder 3 that comprises a built-in Peltier cooler 8. In an embodiment, the Peltier cooler 8 is positioned at 45° with respect to the light source 1 and a filter chamber 4. This orientation allows the sample holder 3 to act as a heat sink, which may provide stability to the desired temperature setting. The TPM Device further comprises a photosensor module, which can detect phosphor light from the phosphor sample. The photosensor module is comprised of a power source, such as a power supply circuit 2, and a PMT 5. The TPM Device may further comprises a cooling fan 6 to control temperature of the device.

The TPM Device further comprises multiple connectors. Each connector may provide for a trigger output, trigger input, or a PMT signal. In one embodiment, the connectors are Bayonet Neill-Concelman (BNC) connectors; however, those skilled in the art will recognize that other potential connectors may be used to provide similar results. An embodiment of the TPM Device further comprises functionality to select internal or external triggering on the connections.

The TPM Device further comprises a mechanism for recording data from the TPM Device. In one embodiment the recording mechanism comprised an oscilloscope. The recording mechanism can be used to display and record outputs, including trigger or PMT outputs from the TPM Device. The recording mechanism allows for the signal acquisition to be averaged over multiple waveforms and record measurements averaged over multiple acquisitions. In testing, an oscilloscope was used to average over 512 waveforms and provides the ability to make measurements averaged over 512 acquisitions. In testing, a resolution of 10,000 points was chosen as a compromise between signal resolution and response time; however, those having skill in the art may modify that resolution in order to modify response time or signal resolution. The oscilloscope gives a rough estimate of the time frame for the decay time. A labeled drawing of the interior of the TPM Device is shown in FIG. 2.

Description of Methodology. For many luminescent materials, the reduction in light intensity following the cessation of excitation can be written as Equation 1.

$$I(t) = I_0 e^{-t/\tau} \qquad \text{Equation (1)}$$

where t is the time since the end of excitation in seconds, $I(t)$ is the emission intensity as a function of time, $I_0$ is the emission immediately following the end of the excitation, and $\tau$ is the decay time. The time needed to reduce the light intensity to (36.8%) of its original value is defined as the fluorescence decay time ($\tau$). Typically, the decay time is a function of temperature for most materials. As a function of temperature, some of these materials' decay times initially increase, but then follow the general trend of decreasing with increase in temperature.

Some materials occasionally exhibit multiexponential behavior, which in the case of bi-exponential decay can be written as $$I(t,T) = I_0(T)[\alpha_1(T)e^{-t/\tau_1(T)} + \alpha_2(T)e^{-t/\tau_2(T)}] \qquad (2)$$

where $\alpha(T)_1$ is the intensity fraction for the first decay time, $\alpha(T)_2$ is the intensity fraction for the second decay time, $\tau_1(T)$ is the first fluorescence decay time, and $\tau_2(T)$ is the second fluorescence decay time. Note that the sum of the intensity fractions $\alpha_1$ and $\alpha_2$ is one. Integrating under the decay curve of a phosphor, one can obtain the total light yield for that phosphor at the temperature, excitation energy, and excitation duration in question.

Certain numeric computing platforms comprise with a fitting application that allows the user to easily write a custom equation and optimize the fitting parameters as needed. A common problem with fitting programs currently known in the art is the fitting window, that is, the portion of the decay curve to be analyzed. Herein disclosed is a method described as "Double Decay" to plot a decay curve while allowing the user to input start and end times for each file. This is important and provides the user greater control because it is possible for the excitation source to interfere with the emissions of the phosphor early. Additionally, if the curve contains many points beyond the end of the emission, the fit will be artificially biased towards a longer decay time.

FIG. 3 provides a flowchart for the Double Decay process. In this program, the user first supplies the numeric computing platform with the initial guesses and bounds to set the parameters for the fit. The user then inputs a file, which comprises the data collected by the recording mechanism from the measurements taken using the TPM Device. The program then filters out any background noise from the recorded data by integrating the area under the leader, averaging it, and subtracting the average from all data points. The user then inputs the fitting widow and fits the recorded data to the custom equation. The area under the curve in the fitting window is then found via integration. Afterwards, collected temperature data is also read into the platform. The means and uncertainties are then calculated, and resulting data is exported.

As the light decay of a sample followed the nonlinear behavior described in Equation (2), a nonlinear fitting routine to was followed to fit the data in the Double Decay method. In experimentation, the following nonlinear fitting methods were used: (1) Levenberg Marquardt, and (2) Trust-Region. These are both Newton methods; that is, they use the Taylor expansion of the function in question and iteratively search for the minimum error present. Those with skill in the art will recognize that other fitting methods may be used herein. Many numeric computing platforms known in the art for the fitting of single exponential decays utilize the Levenberg-Marquardt algorithm. The disclosed Double Decay method uses the Trust-Region algorithm. The reason is to provide non-physical solutions when the fitting application was not provided with bounds for the respective intensities and decay times.

An advantage of using the Trust-Region method over the Levenberg-Marquardt is that the Trust-Region method does a better job of choosing step size as it adds the constraint of restricting the step size to less than the allowed tolerance at that step. FIG. 7 shows the bounds and initial guesses for the fitted intensities ($I_i = I_0 a_i$) and fitted decay times as well as the settings for the function and variable tolerances. Note that the decay time guesses are placed within the μs regime. This was done because visual inspection of the decay curves showed the fluorescence decayed on these time scales. This can be adjusted by the user to fit the needs of any phosphor.

The Double Decay method will now be described in further detail, and example computer code written in MAT-LAB® for this method is contained in FIG. 9. To begin this process, a user may clear any variables currently present in the workspace, but such step is not required for all applications. The user reads in the temperature file from the recorded data from the TPM Device, and preferably names the file for storage in the program. For the embodiment shown in FIG. 9, if the user has previously fit the data in question, they have also saved the start and end times of the fitting window. This allows the user to do the fitting automatically, saving time. Note that the section of the input file to be read must be hardcoded each time using the embodiment shown in FIG. 9. The program then reads in the start and end times of the fitting window. In order to utilize this feature, the sections for automatically choosing a fitting window must be commented out by the user. The program then creates a vector of the start and end times for the fitting window from the read-in temperature values. In the embodiment shown in FIG. 9, the user provides the number of the last file to be analyzed. This number will be used to properly form the loops used in fitting the potentially large dataset. Then the program calculates the least possible number of times the main loop will need to run in order to fit all files the user desires. In some embodiments, a user may want to process one or more files not at the beginning of a data run. The user is able to choose exactly the selection of files needing analysis by answering the query posed by the program. The user then sets the bound for the outermost loop and calculates the number of files to fit in the last loop. The user may also set the end bounds for the inner loop. If too many plots open at once, severe lag can occur or freeze the program. In the embodiment shown in FIG. 9, only 100 files were to be fit at a time.

For the embodiment shown in FIG. 9, an oscilloscope was used to measure and record the experimental data. The user may create a string containing the file format of the recorded data. A string may also be created containing the prefixes for the files to be analyzed. The user then sets the initial guess values for the ratio and decay time. In an embodiment, the user may reinitialize vectors (T1, Y1, T2, Y2 in FIG. 9) as needed.

The user then converts each loop number into a string containing the corresponding file number and concatenates the pieces of the file to be analyzed. The file to be analyzed is then read in, and vectors are created for the x,y data (graphical data). The user finds the minimum value for the intensity of that data and, if the value is a negative value, shifts the data such that the minimum value in the applicable vector becomes zero.

When taking a measurement, it is important to leave some room to the left of the LED signal. This is a leader. Using the steps, the leader is used to calculate the background noise of the system. The calculated background is then removed from the signal. Fitting a curve to 0 values can artificially bias the fit, so after removing the background, the 0 values are removed. The x.y vectors are then reinitialized.

For initial fitting of a new material, the start and end times for the fitting window will need to be determined visually by the user. The method provided in FIG. 9 plots the data, allowing the user to visually inspect the data and choose the bounds for the fitting window. In an alternate embodiment, if the user has determined the start time for the fitting window, the user can hard code it into the program. Both methods are detailed in FIG. 9. Then find the maximum "y" data value.

Next, select the portion of the signal in the fitting window, and shift the time to start at zero. Smooth the data, and then initialize the intensities of the two decays. Pass the data and initial guesses to the fitting function to create a fit object and a goodness of fit object. The user then retrieves the fitted values from the fit object. From the retrieved fitted values, create a matrix of the fitted values, the sum of squared error, the r-square value, the integrated area under the curve (i.e., the integrated light yield), and the bounds for the fitting window. For the embodiment in FIG. 9, assuming the user takes five measurements at each data point, averages the ratio and decay time for a data point and sets these averages as the new initial guesses. This helps the program make a continuous curve of average fitted values. After every 100 files are fitted, for the embodiment of FIG. 9, the user can check through the plots of the fitted data and ensure no anomalies are present.

After all the files have been fitted, the user can calculate the means and standard deviations of the temperature, the fitted values, and the goodness of fit values. Then, the program plots the average fitted values against temperature. In one embodiment, the user further creates a table of the means and standard deviations of the values and writes them into a file. In further embodiment, the user can create a table of the start and end times of the fitting windows used and writes them into a file.

An embodiment for the process for fitting the decays to a plot can be seen in the code and comments in FIG. 8.

Analyzing Double Exponential Decay Times. The inventors herein measured the temperature-dependent fluorescence decay time for a sample of triethylammonium tetrakis (dibenzoylmethide) europate (III), which is more commonly known as europium tetrakis ($EuD_4TEA$). In performing those measurements, it became apparent that $EuD_4TEA$ likely has two exponential decay times.

To determine if the time dependent light decay for $EuD_4TEA$ is best fit by one or two exponentials using Equation (2), a simple analysis was completed using a sample of $EuD_4TEA$ that had been synthesized sample of $EuD_4TEA$ using ethanol as a solvent. The photoluminescence intensity was measured as a function of time using the TPM Device. A 600 nm centroid bandpass filter with a 40 nm FWHM was used in addition to the 400 nm cut-on filter for this measurement. More than 7,000 data points of the 10,000 collected from the TPM Device for the measurement at room temperature were used for the analysis. Double Decay was used to analyze this data. FIG. 4 shows the resulting data fits using both: (a) single and (b) double exponentials as defined in Equations (1) and (2) respectively. Comparing both plots clearly shows that two exponential decays provide a better fit for Fontenot et al. $EuD_4TEA$ compared to the more traditional single-decay fit. The disclosed Double Decay application was found to work well for this analysis.

Figure 5:
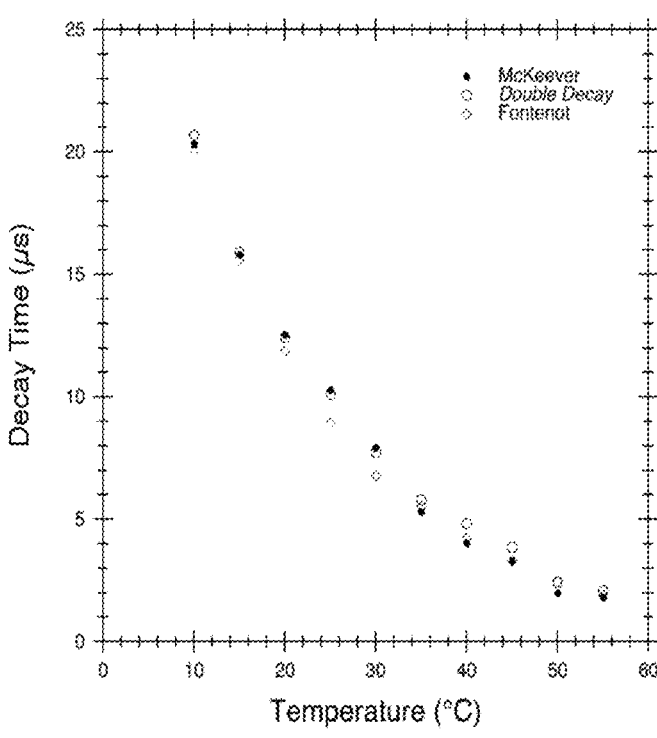
FIG. 5 depicts decay times for a powdered europium doped lanthanum oxysulphide ($La_2O_2S:Eu$) sample.

Analyzing Single Exponential Decay Times. The Double Decay application can easily be adapted to fit single-exponential decay times by changing the bounds of the second intensity to zero. To demonstrate this capability, the inventors investigated inorganic $La_2O_2S:Eu$. The prior art provided published temperature-dependent decay times for $La_2O_2S:Eu$ as measured with the TPM Device. To check the effectiveness of the Double Decay application, it was decided to re-analyze the prior art data. FIG. 5 shows the temperature dependent decay time data for $La_2O_2S$:Eu as analyzed originally in the prior art, the Double Decay analysis, and the other known methods of Decay Time analysis. Notice that the decay times plotted from the three programs are statistically the same over the measured temperature range of 10 to 60° C. This simple comparison clearly shows that the Double Decay application does a good job analyzing decay times for phosphors.

Figure 6:
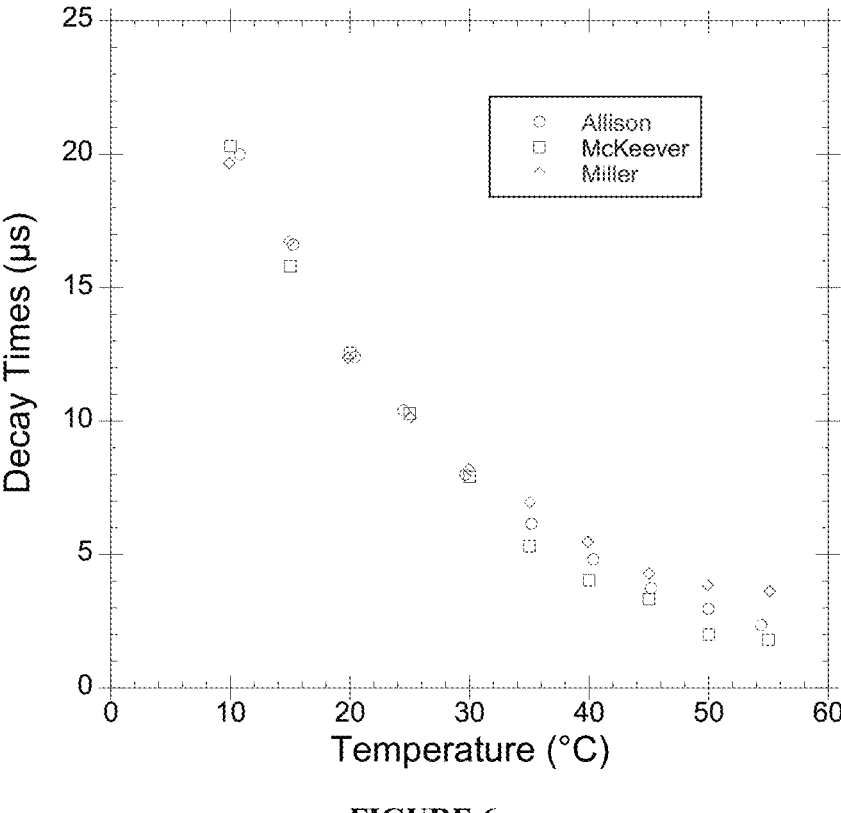
FIG. 6 depicts fitted decay times of the europium doped lanthanum oxysulphide ($La_2O_2S:Eu$) 514 nm emission.

$La_2O_2S$:Eu Results. FIG. 6 shows the decay times versus temperature for the 514 nm emission of $La_2O_2S$:Eu. The error bars from the present work are less than 5% of the fitted values for the decay times, and less than 1% for the temperatures. The fitted decay times are very close until 35° C., which is when the intensity of the emission grew weak. This shows good agreement between the three measurements. Note the two TPM Device measurements bracket the results from the classical method.

TPM Devices may be designed to measure the temperature-dependent properties and total emission light yields for almost any phosphor, allowing measurement of the prompt fluorescent decay and rise times over a temperature range. The inventors herein have disclosed a new application called Double Decay which will quickly provide for the analysis of multiple decays from individual phosphors. Results from Double Decay were found to be statistically similar to data analyzed in earlier publications. The photoluminescent decay times measured with the TPM Device were shown to compare favorably with previously reported results.

The invention disclosed herein solves two problems: 1) the difficulty of obtaining a calibration curve for decay times as a function of temperature and 2) the difficulty of fitting light decay curves that follow equation 2. As for the first problem, PL materials can be modeled from first principle calculations. Their decay times as a function of temperature can be predicted using kinetics. Regarding the second problem, it was discovered that the ratio of the two decay times from the PL material changed linearly and monotonically over the temperature range in question. Therefore, a modified equation 2 leads to equation 3:

$$I(t)=I_0(\alpha_1 e^{-t/\beta\tau_2}+\alpha_2 e^{-t/\tau_2}) \qquad \text{Equation (3)}$$

where $\beta=\tau_1/\tau_2$.

This new quantity, $\beta$, can be effectively used to determine the temperature of a bi-exponential decay curve. This eliminates the algorithmic search for a fitting window and allows for the use of two PL materials in one sensor.

Conventional methods of measuring surface temperature include thermocouples, thermistors, and pyrometers. Thermocouples can be subject to contact resistances if they have bad surface contact. Welding the thermocouple to the surface can solve this problem but isn't always practicable. Every thermistor requires its own circuit, which increases complexity and power draw. Furthermore, they can interfere with other nearby sensors. Pyrometers do not fare well in environments containing soot radiation or chemiluminescence and are not good in flames and plasmas. Even worse, the wavelength-dependent emissivity of the surface can change over time, causing large errors in measurement.

Phosphor thermometry is not subject to these major issues. Combining PL material with a binder suitable for the desired environment is an easy matter, allowing them to be placed on any surface desired. By choosing the PL material carefully, the background emission of flames and plasmas can be filtered out. Monitoring multiple locations can be accomplished simply by adding to the number of fiberoptic cables used and choosing a PMT with multiple anodes. Furthermore, PL materials do not interfere with nearby sensors.

Thus, phosphor thermometry has a wide range of suitable applications. It has been used to measure the temperature of a jet engine turbine in operation, and liquid helium tanks. It has been suggested for measuring the temperature of rocket plumes, reactor cooling towers, and moving parts. There has lately been an explosion of interest in biological applications of phosphor thermometry.

The subject matter of the present invention is described with specificity herein to meet statutory requirements. However, the description itself is not intended to necessarily limit the scope of claims. Rather, the claimed subject matter might be embodied in other ways to include different steps or combinations of steps similar to the ones described in this document, in conjunction with other present or future technologies.

For the purpose of understanding the METHOD FOR MEASURING FLUORESCENT DECAY IN PHOSPHORS, references are made in the text to exemplary embodiments of a METHOD FOR MEASURING FLUORESCENT DECAY IN PHOSPHORS, only some of which are described herein. It should be understood that no limitations on the scope of the invention are intended by describing these exemplary embodiments. One of ordinary skill in the art will readily appreciate that alternate but functionally equivalent components, materials, designs, and equipment may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

We claim:

1. A method for measuring fluorescent decay in a phosphor sample comprising:
    (a) providing a thermographic phosphor measuring device, comprising:
      a display;
      two or more exterior panels;
      a Peltier cooler;
      a phosphor sample holder;
      a thermocouple;
      a photomultiplier tube;
      a circuit board, comprising associated circuitry comprising functionality to provide power and control to said device;
      a light source;
      a filter chamber;
      at least two connectors; and
      a recording mechanism;
    (b) exposing the phosphor sample to the light source;
    (c) collecting data regarding the phosphor sample's excitation and luminosity;
    (d) recording the collected data; and
    (e) performing a Double Decay process.

2. The method of claim 1, wherein the thermographic phosphor measuring device further comprises a cooling fan.

3. The method of claim 1, wherein the thermographic phosphor measuring device further comprises mechanisms for the adjustment of input variables.

4. The method of claim 1, wherein the recording mechanism comprises an oscilloscope.

5. The method of claim 1, wherein the Double Decay process comprises determining a bi-exponential decay of the phosphor sample comprising:

$$I(t)=I_0(\alpha_1 e^{-t/\beta\tau 2}\alpha_2 e^{-t/\tau 2})$$

wherein $\alpha(T)_1$ represents an intensity fraction for a first decay time;

wherein $\alpha(T)_2$ represents an intensity fraction for a second decay time;

wherein $\tau_1(T)$ represents a first fluorescence decay time;

wherein $\tau_2(T)$ represents a second fluorescence decay time; and wherein $\beta=\tau_1/\tau_2$.

6. The method of claim 1, wherein the Double Decay process comprises determining a bi-exponential decay of the phosphor sample comprising:

$$I(t)=I_0(\alpha_1 e^{-t/\beta\tau 2}+\alpha_2 e^{-t/\tau 2})$$

wherein $\alpha(T)_1$ represents an intensity fraction for a first decay time;

wherein $\alpha(T)_2$ represents an intensity fraction for a second decay time;

wherein $\tau_1(T)$ represents a first fluorescence decay time;

wherein $\tau_2(T)$ represents a second fluorescence decay time;

wherein $\beta=\tau_1/\tau_2$; and wherein a sum of the intensity fractions $\alpha_1$ and $\alpha_2$ is 1.

7. The method of claim 1, wherein the Double Decay process comprises:

(a) inputting into a numeric computing platform initial guesses and bounds determined by a user to set one or more parameters for a plot;

(b) input an input file, comprising data recorded by the recording mechanism;

(c) filtering out any background noise from the recorded data;

(d) inputting a fitting widow;

(e) fitting the recorded data;

(f) inputting temperature data; and (g) calculating means and uncertainties.

8. The method of claim 7, wherein the Double Decay further comprises applying a Trust-Region algorithm.

9. The method of claim 7, wherein the thermographic phosphor measuring device further comprises:

a display;

two or more exterior panels;

a Peltier cooler;

a phosphor sample holder;

a thermocouple;

a photomultiplier tube;

a circuit board, comprising associated circuitry comprising functionality to provide power and control to said device; and a filter chamber.

10. The method of claim 7, wherein the recording mechanism comprises an oscilloscope.

11. A method for measuring fluorescent decay in a phosphor sample comprising:

(a) providing a thermographic phosphor measuring device;

(b) inserting the phosphor sample into the thermographic phosphor measuring device;

(c) exposing the phosphor sample to a light source contained within an interior of the thermographic phosphor measuring device;

(d) collecting data regarding the phosphor sample's excitation and luminosity by a recording mechanism that is connected to the thermographic phosphor measuring device by at least two connectors;

(e) recording the collected excitation and luminosity data; and (f) performing a Double Decay process, comprising:

i. inputting into a numeric computing platform initial guesses and bounds determined by a user to set one or more parameters for a plot;

ii. input an input file, comprising data recorded by the recording mechanism;

iii. filtering out any background noise from the recorded data;

iv. inputting a fitting widow;

v. fitting the recorded data;

vi. inputting temperature data; and vii. calculating means and uncertainties.

\* \* \* \* \*